United States Patent
Rhodes

(10) Patent No.: US 7,574,458 B2
(45) Date of Patent: Aug. 11, 2009

(54) COMPUTER BACKUPS USING UN-USED DISK SPACE

(75) Inventor: James J. Rhodes, Bethlehem, PA (US)

(73) Assignee: Lenovo (Singapore) Pte Ltd., Singapore (SG)

( * ) Notice: Subject to any disclaimer, the term of this patent is extended or adjusted under 35 U.S.C. 154(b) by 343 days.

(21) Appl. No.: 10/734,864

(22) Filed: Dec. 12, 2003

(65) Prior Publication Data

US 2005/0131958 A1    Jun. 16, 2005

(51) Int. Cl.
*G06F 17/30* (2006.01)
(52) U.S. Cl. .......................... 707/204; 707/1; 707/200; 707/104.1
(58) Field of Classification Search ................ 707/204, 707/10, 100, 200
See application file for complete search history.

(56) References Cited

U.S. PATENT DOCUMENTS

| | | | |
|---|---|---|---|
| 5,745,906 A | 4/1998 | Squibb | 707/203 |
| 5,778,395 A * | 7/1998 | Whiting et al. | 707/204 |
| 5,812,748 A | 9/1998 | Ohran et al. | 714/4 |
| 5,875,478 A | 2/1999 | Blumenau | 711/162 |
| 5,893,119 A | 4/1999 | Squibb | 707/203 |
| 5,978,565 A | 11/1999 | Ohran et al. | 714/13 |
| 7,043,619 B1 * | 5/2006 | Knight | 711/170 |
| 2004/0049700 A1 * | 3/2004 | Yoshida | 713/201 |

OTHER PUBLICATIONS

"Second Copy 2000, Version 6", copyright 2000, pp. 1-15.*

* cited by examiner

*Primary Examiner*—Hung Q Pham
(74) *Attorney, Agent, or Firm*—Lieberman & Brandsdorfer, LLC

(57) ABSTRACT

A method, computer program product and system for backing up and restoring files using systems with available disk space. A daemon application may be installed on systems with available disk space to store backup files. The daemon application may transmit data to a central system that indicates the amount of available disk space on its system. The central system may create a master file that includes a listing of systems with available disk space and the amount of available disk space for each listed system. A backup application may be installed on systems whose files are to be backed up. The backup application may be configured to download the master file and determine which systems from the master file are to receive the files to be backed up from its system. By storing backup files on systems with available disk space, a company may reduce its cost in backing up files.

19 Claims, 7 Drawing Sheets

COMPUTER BACKUPS USING UN-USED DISK SPACE

TECHNICAL FIELD

The present invention relates to the field of data processing systems, and more particularly to backing up files using un-used disk space thereby reducing cost in backing up files.

BACKGROUND INFORMATION

To protect data information in a data processing system from being lost, there is a need for a regular process in which the data is saved or backed up on a data storage media where the data storage media may be located either internally or externally from the data processing system. This regular process of saving data is often referred to as performing a "backup."

Computer files may be backed up to either tape media or to a hard disk. Backing up files to tape media requires backup software, a device that can write the files to be backed up to the tape media as well as the tape media itself. Backing up files to a hard disk requires backup software, expensive disk devices to store the backup files, expensive disk devices to provide redundancy and additional costs in operating the disk devices. Backing up files using either of these methods is expensive.

If a company could back up files without requiring the purchase of additional hardware and software as described above, companies would be able to reduce their cost in backing up files.

Therefore, there is a need in the art to be able to backup computer files without requiring the purchase of additional hardware and software as described above.

SUMMARY

The problems outlined above may at least in part be solved in some embodiments by installing an application, referred to herein as a daemon application, on systems with available disk space that may be used to store backup files from other systems. The daemon application may transmit data to a central system that indicates the amount of available disk space on its system. The central system may create a file, referred to herein as the master file, that includes a listing of systems with available disk space and the amount of available disk space for each listed system. An application, referred to herein as a backup application, may be installed on systems whose files are to be backed up. The backup application may be configured to download the master file and determine which systems from the master file are to receive the files to be backed up from its system. By storing backup files on systems with available disk space instead of purchasing additional hardware and software for backing up computer files, a company may reduce its cost in backing up files.

In one embodiment of the present invention, a method for backing up and restoring files may comprise the step of installing a daemon application on systems with available disk space to store backup files. The method may further comprise receiving metadata from the installed daemon applications where the metadata comprises information regarding available disk space. The method may further comprise creating a master file where the master file comprises information regarding a list of systems available to store backup files and an amount of available disk space to store backup files for each system available to store backup files. The method may further comprise installing a backup application on systems to perform a backup operation. The method may further comprise receiving a request from the backup application to download the master file.

The foregoing has outlined rather generally the features and technical advantages of one or more embodiments of the present invention in order that the detailed description of the invention that follows may be better understood. Additional features and advantages of the invention will be described hereinafter which may form the subject of the claims of the invention.

BRIEF DESCRIPTION OF THE DRAWINGS

A better understanding of the present invention can be obtained when the following detailed description is considered in conjunction with the following drawings, in which.

DETAILED DESCRIPTION

The present invention comprises a method, computer program product and system for backing up and restoring files using systems with available disk space. In one embodiment of the present invention, an application, referred to herein as a daemon application, may be installed on systems with available disk space that may be used to store backup files from other systems. The daemon application may transmit data to a central system that indicates the amount of available disk space on its system. The central system may create a file, referred to herein as the master file, that includes a listing of systems with available disk space and the amount of available disk space for each listed system. An application, referred to herein as a backup application, may be installed on systems whose files are to be backed up. The backup application may be configured to download the master file and determine which systems from the master file are to receive the files to be backed up from its system. By storing backup files on systems with available disk space instead of purchasing additional hardware and software for backing up computer files, a company may reduce its cost in backing up files.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Figure 1:
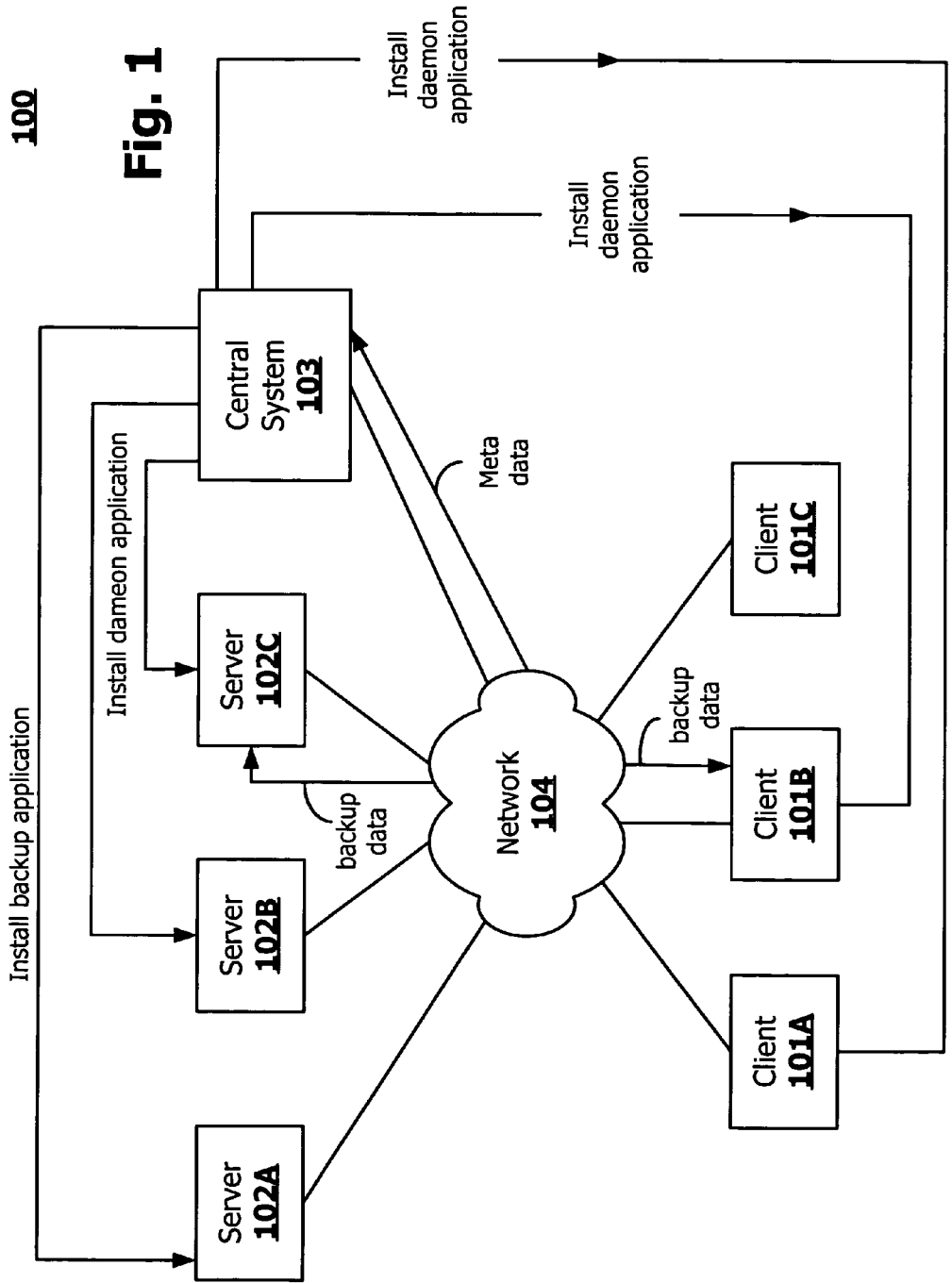
FIG. 1 illustrates a network system in accordance with an embodiment of the present invention.

FIG. 1—Network System

FIG. 1 illustrates an embodiment of a network system 100 in accordance with the present invention. Network system 100 may comprise one or more clients 101A-C coupled to one or more servers 102A-C and a central system 103 via a network 104. Central system 103 may be coupled to each server 102A-C and each client 101A-C. Clients 101A-C may collectively or individually be referred to as clients 101 or client 101, respectively. A more detail description of clients 101 is provided below in association with FIG. 2. Servers 102A-C may collectively or individually be referred to as servers 102 or server 102, respectively. A more detail description of servers 102 is provided further below in association with FIG. 3. A more detail description of central system 103 is provided further below in association with FIG. 3. Client 101 and server 102 may be referred to herein as a "system" or a "computer system" as both client 101 and server 102 may be configured to either back up files from other systems in its available disk space, as discussed further below, or have its files backed up on another system and later restored, as discussed further below. Central system 103 may be configured to install applications on systems in order to back up files on such systems or restore files on such systems as discussed further below. Network 104 may be a Local Area Network (LAN), e.g., Ethernet, Token Ring, ARCnet or a Wide Area Network (WAN), e.g., Internet. It is noted that the Internet may refer to a network of computers. It is noted that the connection between client 101 and server 102, central system 103 may be any medium type, e.g., wireless, wired. It is further noted that client 101 may be any type of device, e.g., wireless, Personal Digital Assistant (PDA), cell phone, personal computer system, workstation, Internet appliance, configured with the capability of connecting to network 104 and consequently communicating with server 102, central system 103. It is noted that network system 100 may be any type of system that has at least a system to store backup data and at least a system whose files are to be restored and that FIG. 1 is not to be limited in scope to any one particular embodiment. It is further noted that even though the description below describes embodiments of the present invention as using central system 103 in backing up and restoring files that the principles of the present invention may be applied to embodiments without having central system 103.

Referring to FIG. 1, central system 103 may be configured to install an application, referred to herein as a "daemon application," on each system with available disk space to store backup files. The "daemon application" may refer to a software application running in the background ready to perform an operation when required. For example, central system 103 may install a daemon application on systems 101A, 101B and 102C as illustrated in FIG. 1. By using systems with available disk space to store backup files, a company may not have to purchase additional hardware and software in backing up files thereby saving the company costs in backing up files. The installed daemon application may then transmit metadata (illustrated in FIG. 1) that includes information such as the available disk space on the system that may be used to store backup files. Central system 103 may further be configured to install an application, referred to herein as a "backup application," on systems whose files are to be backed up as well as restored. For example, central system 103 may install a backup application on system 102A as illustrated in FIG. 1. The installed backup application may then request the master file from central system 103 so that the backup application would be able to determine which systems to store the files to be backed up on its system. The backup data may be stored across multiple systems as illustrated in FIG. 1, e.g., client 101B, server 102C.

The process by which files may be backed up and restored using the architecture of FIG. 1 is described further below in association with FIGS. 4-7.

FIG. 2—Client

Figure 2:
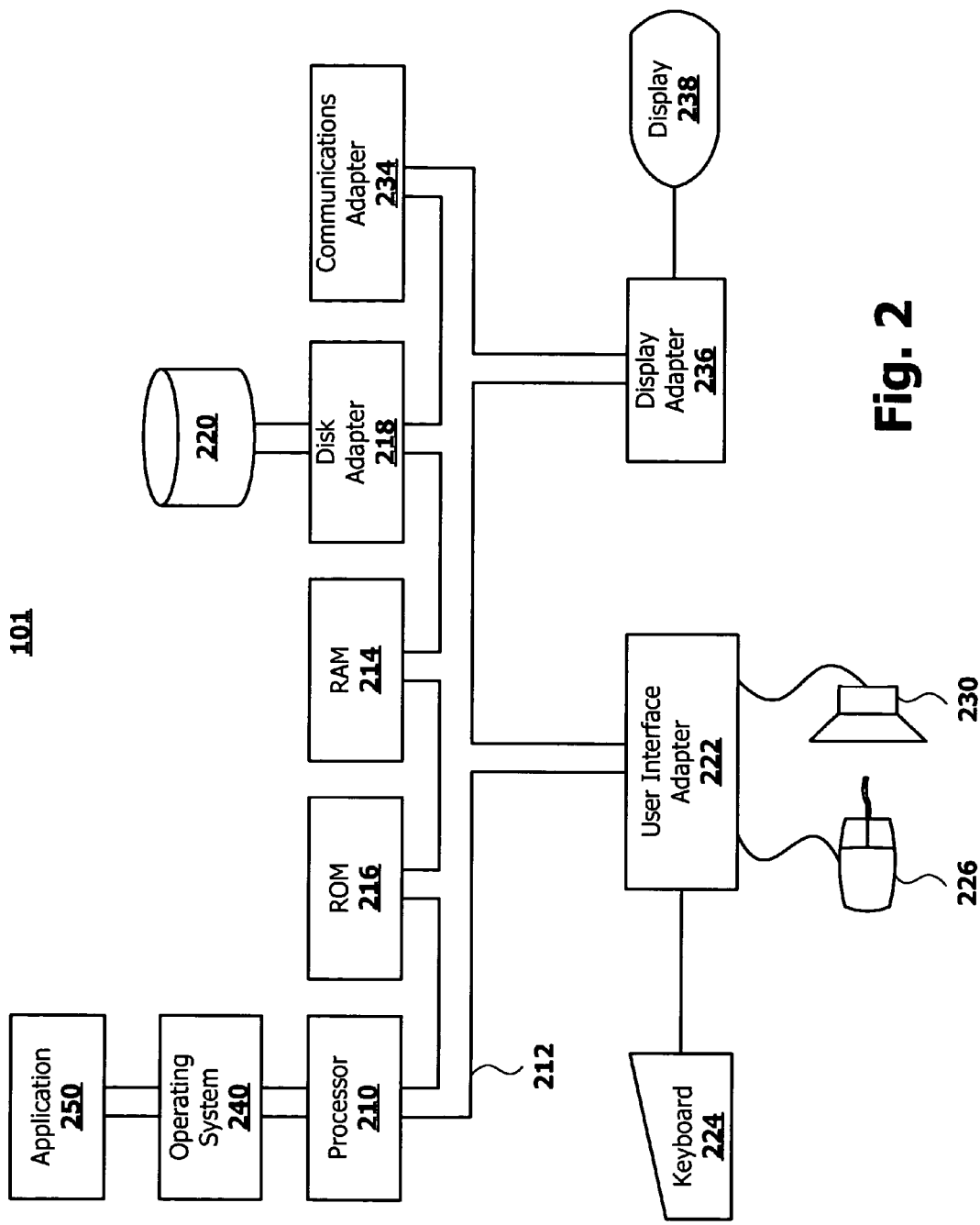
FIG. 2 illustrates an embodiment of the present invention of a client in the network system.

FIG. 2 illustrates a typical hardware configuration of client 101 (FIG. 1) which is representative of a hardware environment for practicing the present invention. Referring to FIG. 2, client 101 may have a processor 210 coupled to various other components by system bus 212. An operating system 240, may run on processor 210 and provide control and coordinate the functions of the various components of FIG. 2. An application 250 in accordance with the principles of the present invention may run in conjunction with operating system 240 and provide calls to operating system 240 where the calls implement the various functions or services to be performed by application 250. Application 250 may include, for example, a daemon application configured to communicate with central system 103 as discussed further below in association with FIG. 4. Application 250 may further include a backup application for backing up files as well as restoring files as discussed further below in association with FIGS. 4-6.

Read only memory (ROM) 216 may be coupled to system bus 212 and include a basic input/output system ("BIOS") that controls certain basic functions of client 101. Random access memory (RAM) 214 and disk adapter 218 may also be coupled to system bus 212. It should be noted that software components including operating system 240 and application 250 may be loaded into RAM 214 which may be client's 101 main memory. Disk adapter 218 may be an integrated drive electronics ("IDE") adapter that communicates with a disk unit 220, e.g., disk drive. Disk unit 220 may contain available disk space that may be used to store backup files as discussed further below in association with FIGS. 4-7. Disk unit 220 may be configured to store metadata and a key associated with the data to be backed up as discussed further below in association with FIGS. 5-7. It is noted that the daemon application that communicates with central system 103, as discussed further below in association with FIG. 4, may reside in disk unit 220 or in application 250. It is further noted that the backup application, as discussed in association with FIGS. 4-6, may reside in disk unit 220 or in application 250.

Returning to FIG. 2, communications adapter 234 may also be coupled to system bus 212. Communications adapter 234 may interconnect bus 212 with an outside network enabling client 101 to communicate with server 102 (FIG. 1), central system 103 (FIG. 1). Input/Output devices may also be connected to system bus 212 via a user interface adapter 222 and a display adapter 236. Keyboard 224, mouse 226 and speaker 230 may all be interconnected to bus 212 through user interface adapter 222. Event data may be inputted to client 102 through any of these devices. A display monitor 238 may be connected to system bus 212 by display adapter 236. In this manner, a user is capable of inputting to client 101 through keyboard 224 or mouse 226 and receiving output from client 101 via display 238 or speaker 230.

Implementations of the invention include implementations as a computer system programmed to execute the method or methods described herein, and as a computer program product. According to the computer system implementations, sets of instructions for executing the method or methods may be resident in the random access memory 214 of one or more computer systems configured generally as described above. Until required by client 101, the set of instructions may be stored as a computer program product in another computer memory, for example, in disk unit 220. Furthermore, the computer program product may also be stored at another computer and transmitted when desired to the user's workstation by a network or by an external network such as the Internet. One skilled in the art would appreciate that the physical storage of the sets of instructions physically changes the medium upon which it is stored so that the medium carries computer readable information. The change may be electrical, magnetic, chemical or some other physical change.

Figure 3:
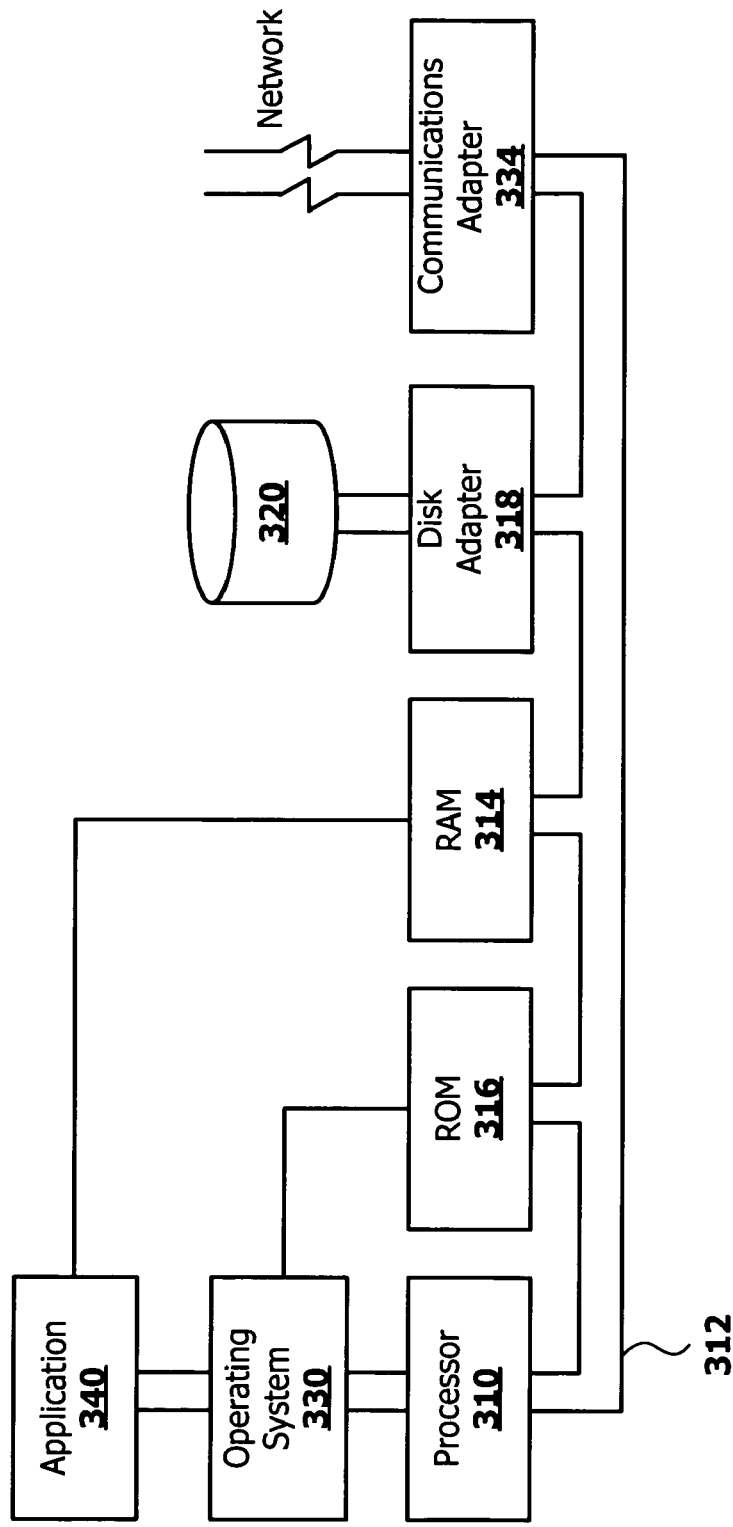
FIG. 3 illustrates an embodiment of the present invention of a server and a central system in the network system.

FIG. 3—Server and Central System

FIG. 3 illustrates an embodiment of the present invention of server 102 (FIG. 1) and central system 103 (FIG. 1). Referring to FIG. 3, server 102, central system 103 may comprise a processor 310 coupled to various other components by system bus 312. An operating system 330 may run on processor 310 and provide control as well as coordinate the function of the various components of FIG. 3. An application 340 in accordance with the principles of the present invention may run in conjunction with operating system 330 and provide calls to operating system 330 where the calls implement the various functions or services to be performed by application 340. An application 340 for server 102 may include, for example, a daemon application configured to communicate with central system 103 as discussed further below in association with FIG. 4. Application 340 for server 102 may further include a backup application for backing up files as well as restoring files as discussed further below in association with FIGS. 4-6. Application 340 for central system 103 may include, for example, a program for installing the daemon and backup application as discussed further below in association with FIG. 4. Application 340 for central system 103 may further include, a program for updating the master file and transmitting the updated master file as discussed further below in association with FIG. 5. Application 340 for central system 103 may further include, a program for restoring backup files to a system, e.g., client 101 (FIG. 1), server 102, that crashed, as discussed further below in association with FIG. 7.

Read only memory (ROM) 316 may be coupled to system bus 312 and include a Basic Input/Output System ("BIOS") that controls certain basic functions of server 102, central system 103. Random access memory (RAM) 314, disk adapter 318 and communications adapter 334 may also be coupled to system bus 312. It should be noted that software components including operating system 330 and application 340 may be loaded into RAM 314 which may be the main memory for server 102, central system 103. Disk adapter 318 may be an integrated drive electronics ("IDE") adapter that communicates with a disk unit 320. Disk unit 320 of server 102 may contain available disk space that may be used to store backup files as discussed further below in association with FIGS. 4-7. Disk unit 320 of server 102, central system 103 may be configured to store metadata and a key associated with the data to be backed up as discussed further below in association with FIGS. 5-7. It is noted that the daemon application of server 102 that communicates with central system 103, as discussed further below in association with FIG. 4, may reside in disk unit 320 or in application 340. It is further noted that the backup application of server 102, as discussed further below in association with FIGS. 4-7, may reside in disk unit 320 or in application 340. It is further noted that the program of the present invention of central system 103 that installs the daemon and backup application, as discussed further below in association with FIG. 4, may reside in disk unit 320 or in application 340. It is further noted that the program of the present invention of central system 103 that updates the master file and transmits the updated master file, as discussed further below in association with FIG. 5, may reside in disk unit 320 or in application 340. It is further noted that the program of the present invention of central system 103 that restores backup files to a system, e.g., client 101, server 102, that crashed, as discussed further below in association with FIG. 7, may reside in disk unit 320 or in application 340.

Communications adapter 334 of server 102 may enable server 102 to communicate with client 101, central system 103 as discussed in further detail in association with FIGS. 4-7. Communications adapter 334 of central system 103 may enable central system 103 to communicate with client 101, server 102 as discussed in further detail in association with FIGS. 4-7.

Implementations of the invention include implementations as a computer system programmed to execute the method or methods described herein, and as a computer program product. According to the server, central system implementations, sets of instructions for executing the method or methods may be resident in the random access memory 314 of one or more computer systems configured generally as described above. Until required by server 102, central system 103, the set of instructions may be stored as a computer program product in another computer memory, for example, in disk drive 320 (which may include a removable memory such as an optical disk or floppy disk for eventual use in disk drive 320). Furthermore, the computer program product may also be stored at another computer and transmitted when desired to the user's workstation by a network or by an external network such as the Internet. One skilled in the art would appreciate that the physical storage of the sets of instructions physically changes the medium upon which it is stored so that the medium carries computer readable information. The change may be electrical, magnetic, chemical or some other physical change.

As stated in the Background Information section, computer files may be backed up to either tape media or to a hard disk. Backing up files to tape media requires backup software, a device that can write the files to be backed up to the tape media as well as the tape media itself. Backing up files to a hard disk requires backup software, expensive disk devices to store the backup files, expensive disk devices to provide redundancy and additional costs in operating the disk devices. Backing up files using either of these methods is expensive. If a company could back up files without requiring the purchase of additional hardware and software as described above, companies would be able to reduce their cost in backing up files. Therefore, there is a need in the art to be able to backup computer files without requiring the purchase of additional hardware and software as described above.

Figure 4:
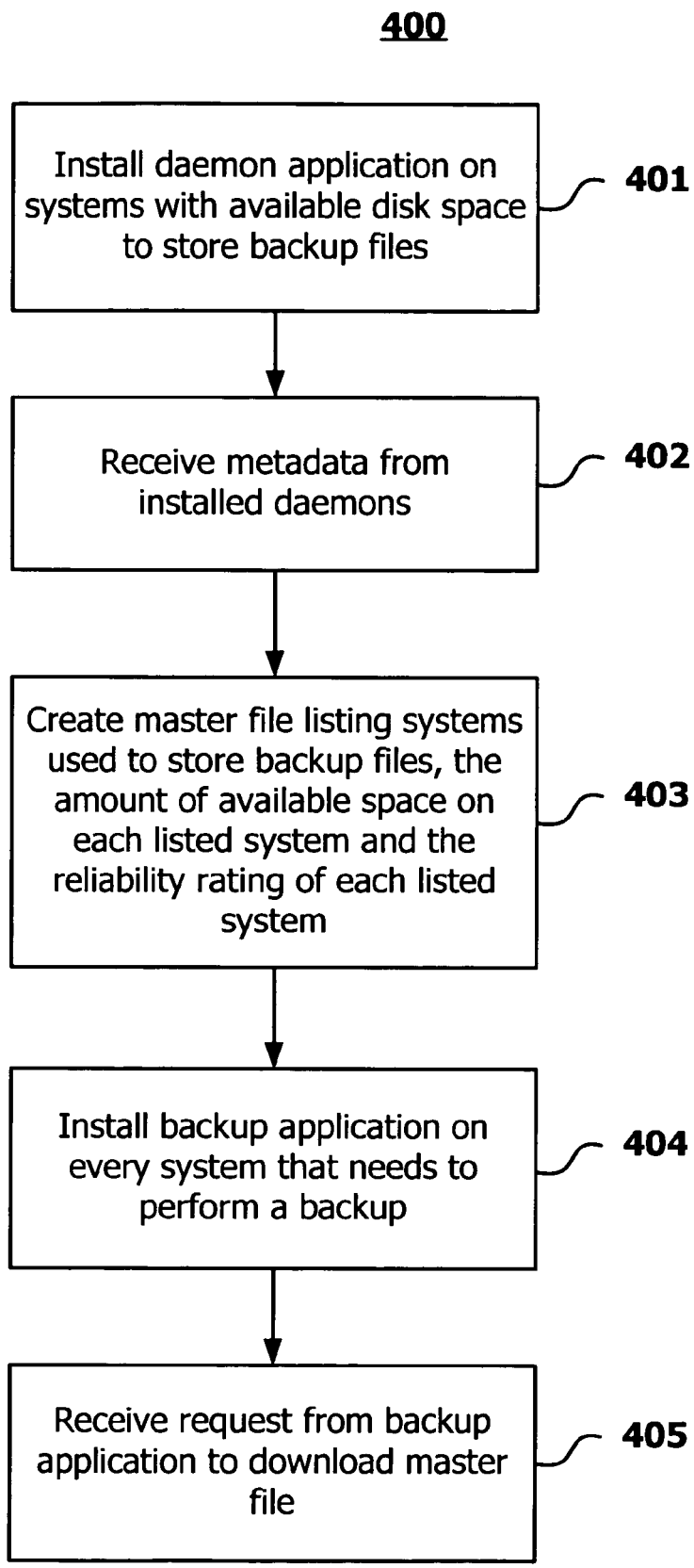
FIG. 4 is a flowchart of a method for initializing the network system in accordance with an embodiment of the present invention.
Figure 5:
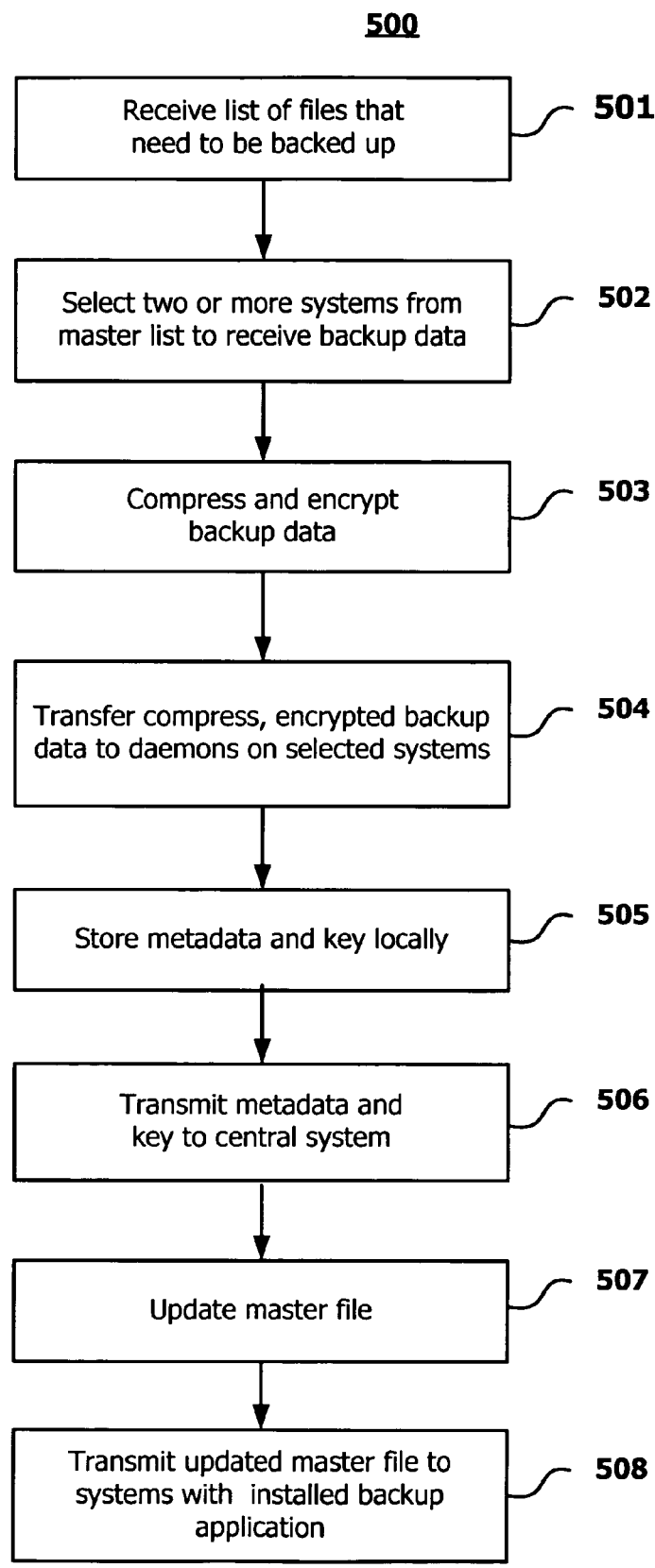
FIG. 5 is a flowchart of a method for backing up data in a system with available disk space in accordance with an embodiment of the present invention.
Figure 6:
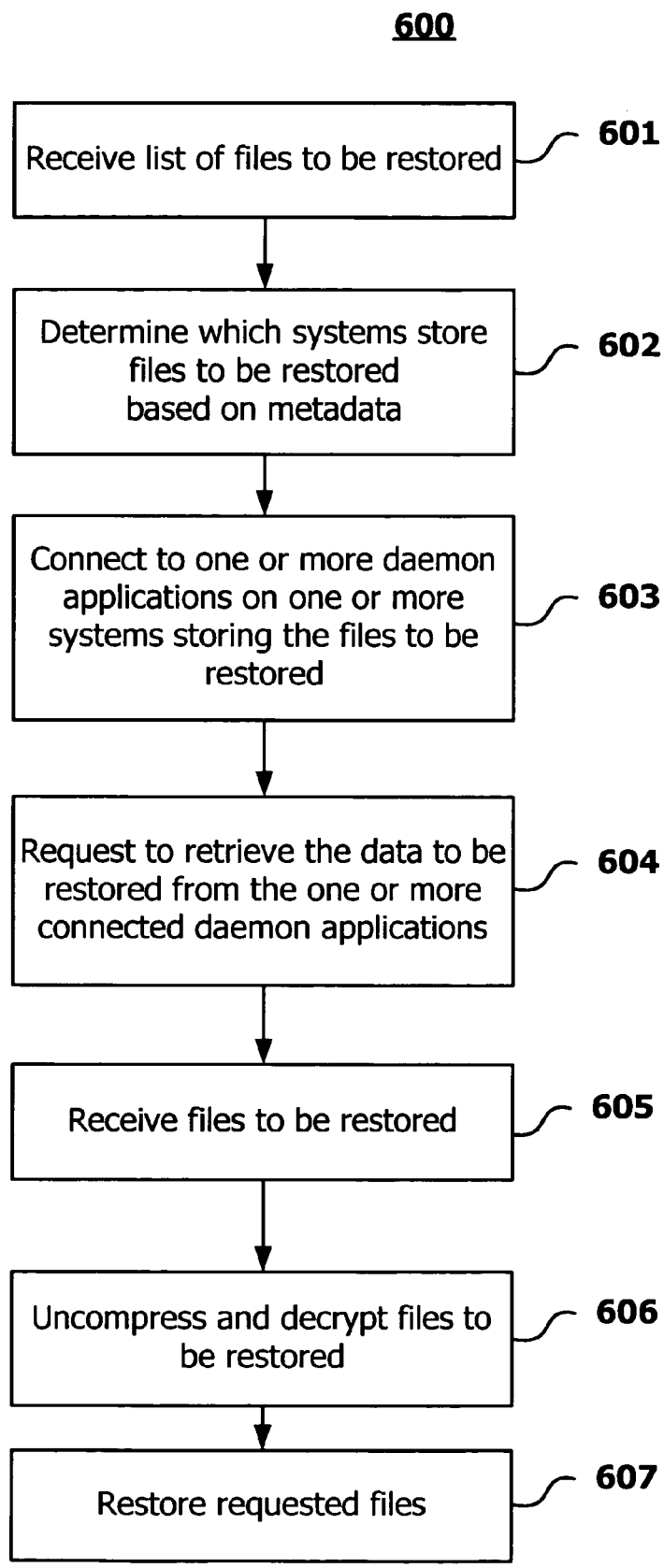
FIG. 6 is a flowchart of a method for restoring backed up files in accordance with an embodiment of the present invention.
Figure 7:
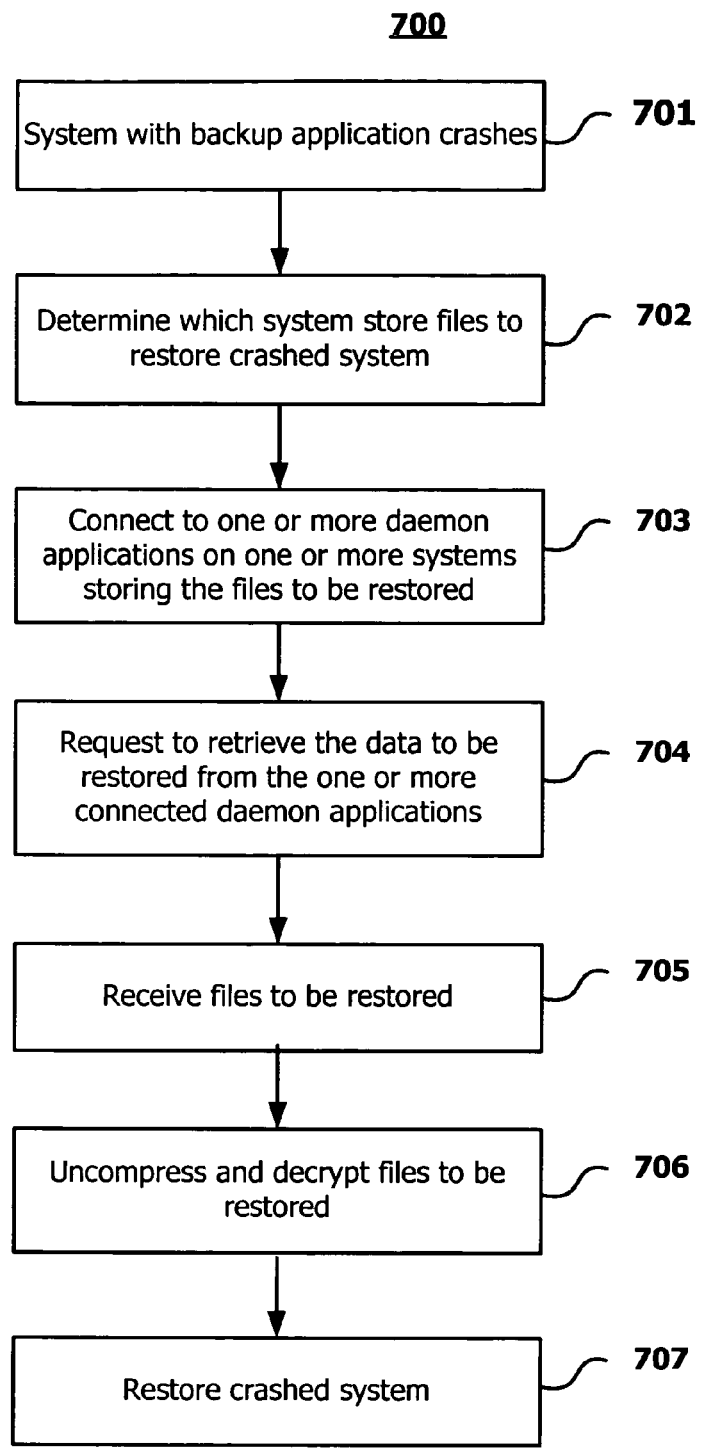
FIG. 7 is a flowchart of a method for restoring files in a system that crashed in accordance with an embodiment of the present invention.

Companies may be able to backup computer files without requiring the purchase of additional hardware and software as described above by backing up files to un-used disk space in systems, e.g., client 101, server 102, currently used by the company thereby reducing cost in backing up files. Companies may back up files using un-used disk space in systems, e.g., client 101, server 102, currently used by the company using the architecture as discussed above in association with FIG. 1. The process by which files may be backed up and restored using the architecture of FIG. 1 is described below in association with FIGS. 4-7. FIG. 4 is a flowchart of a method for installing daemon and backup applications by central system 103. FIG. 5 is a flowchart of a method for backing up data in a system with available disk space. FIG. 6 is a flowchart of a method for restoring files to a system. FIG. 7 is a flowchart of a method for restoring files when the system with the backup application crashes and cannot be used to decrypt the restored files.

FIG. 4—Method for Initializing Network System

FIG. 4 is a flowchart of one embodiment of the present invention of a method 400 for initializing network system 100 to be able to store backup files in systems with available disk space as well as to restore the backed-up files.

Referring to FIG. 4, in conjunction with FIG. 1, in step 401, central system 103 installs a daemon application on systems with available disk space in disk 220, 320 to store backup files.

In step 402, central system 103 receives metadata from the installed daemon application. The metadata may include information such as the available disk space on the system that may be used to store backup files.

In step 403, central system 103 creates a master file listing systems used to store backup files as well as the amount of available space on each listed system to store backup files. The master file may further include information as to the reliability rating of each of the listed systems. The reliability rating may refer to an indication as to how reliable the network connectivity to the listed system is. In one embodiment, an agent may be installed on the system to be used for backup purposes. The installed agent may be configured to monitor the network connectivity of the system and report back its results to central system 103, such as on a periodic basis.

In step 404, central system 103 installs a backup application on every system, e.g., client 101, server 102, that needs to perform a backup operation. In step 405, central system 103 receives a request from the installed backup application to download the master file created in step 403. By having each system with an installed backup application receive a copy of the master file, the system may be able to select the systems to store its files to be backed up as discussed further below in association with FIG. 5.

It is noted that method 400 may include other and/or additional steps that, for clarity, are not depicted. It is further noted that method 400 may be executed in a different order presented and that the order presented in the discussion of FIG. 4 is illustrative. It is further noted that certain steps in method 400 may be executed in a substantially simultaneous manner.

FIG. 5—Method for Backing Up Data in a System with Available Disk Space

FIG. 5 is a flowchart of one embodiment of the present invention of a method 500 for backing up data in a system, e.g., client 101, server 102, with available disk space in disk unit 220, 320.

Referring to FIG. 5, in conjunction with FIG. 1, in step 501, the backup application in a system, e.g., client 101, server 102, with files to be backed up, receives a list of files that need to be backed up. In one embodiment, central system 103 transmits to the backup application a list of files that need to be backed up in that system. In an alternative embodiment, a user of the system with the backup application may indicate to the backup application a list of files, e.g., all the files on the hard drive, that needs to be backed up.

In step 502, the backup application selects two or more systems from the master file to receive the backup data. The backup data may be stored across multiple systems where each system stores a section of the data to be backed up. Further, in one embodiment, multiple systems may store the same data to be backed up for reliability purposes. For example, if one of the two systems storing the same backed up data crashes, then the user may still be able to retrieve the backed up data from the system storing a copy of the backed up data. In one embodiment, the backup application selects two or more systems from the master file stored locally to receive the backup data. In another embodiment, the backup application requests the master file from central system 103 and then selects two or more systems from the master file to receive the backup data.

In step 503, the backup application compresses and encrypts the data to be backed up.

In step 504, the backup application transfers the compressed, encrypted backed up data to the daemons on the systems selected in step 502 to be stored on such systems. It is noted that the backup application may transfer portions of the compressed, encrypted backed up data to multiple daemons located on multiple systems. For example, the backed up data may be stored across multiple systems. Further, it is noted that the backup application may transfer the same portions of the compressed, encrypted backed up data to two daemons location on two systems thereby providing some reliability as discussed above.

In step 505, the backup application stores the metadata and the key associated with the transmitted backed up data locally. For example, the backup application may store the metadata and the key associated with the transmitted backed up data in disk unit 220, 320. In one embodiment, metadata includes information such as: how many bytes of data were stored and in which systems such data was stored, the type of the files, e.g., read-only, write-only, that were backed up, who has ownership of the files backed up, who has privileges to execute the backed up data.

In step 506, the backup application transmits the metadata and the key associated with the transmitted backed up data to central system 103.

In step 507, central system 103 updates the master file using the received metadata. For example, central system 103 may update the master file to indicate that the systems that received the backup data have a reduced amount of available space to store backup files. In step 508, central system 103 transmits the updated master file to systems with an installed backup application thereby providing such systems the latest information to select two or more systems to store files to be backed up.

It is noted that method 500 may include other and/or additional steps that, for clarity, are not depicted. It is further noted that method 500 may be executed in a different order presented and that the order presented in the discussion of FIG. 5 is illustrative. It is further noted that certain steps in method 500 may be executed in a substantially simultaneous manner.

FIG. 6—Method for Restoring Backed Up Files

FIG. 6 is a flowchart of one embodiment of the present invention of a method 600 for restoring files backed up.

Referring to FIG. 6, in conjunction with FIG. 1, in step 601, the backup application in a system, e.g., client 101, server 102, receives a list of files to be restored that had previously been backed up. In one embodiment, central system 103 transmits to the backup application a list of files to be restored. In an alternative embodiment, a user of the system with the backup application may indicate to the backup application a list of files, e.g., all the files on the hard drive, that needs to be restored.

In step 602, the backup application determines which systems store the files to be restored using the metadata. As stated above, the backup application stores a copy of the metadata associated with the data to be backed up on its system. This metadata includes information such as which systems store the backed up data. In an alternative embodiment, the backup application requests the metadata from central system 103 in order to determine which systems stored the data to be restored.

In step 603, the backup application connects to the one or more daemon applications on the one or more systems storing the files to be restored. It is noted that the backup application may only connect to one of the two systems storing duplicate data.

In step 604, the backup application requests to retrieve the data to be restored from the one or more daemon applications connected to the backup application in step 603. As stated above, the backed up data may be stored across multiple systems. Hence, the data to be restored may be stored across multiple systems. The backup application may consequently request particular portions of the backed up data from each daemon application of the systems storing the backed up data.

In step 605, the backup application receives the files to be restored from the one or more connected daemon applications. In step 606, the backup application uncompresses and decrypts the received files to be restored using the key stored locally, e.g., disk unit 220, 320. In step 607, the backup application restores the requested files to be restored.

It is noted that method 600 may include other and/or additional steps that, for clarity, are not depicted. It is further noted that method 600 may be executed in a different order presented and that the order presented in the discussion of FIG. 6 is illustrative. It is further noted that certain steps in method 600 may be executed in a substantially simultaneous manner.

If the system whose data is to be restored crashes, then central system 103 may have to restore the files using the process discussed below as central system 103 may then be the only device that stores the key to decrypt the encrypted backed up data to be restored.

FIG. 7—Restoring Files in System That Crashed

FIG. 7 is a flowchart of one embodiment of the present invention of a method 700 for restoring files in a system, e.g., client 101 (FIGS. 1 and 2), server 102 (FIGS. 1 and 3), that crashed.

Referring to FIG. 7, in conjunction with FIG. 1, in step 701, the system whose files are to be restored crashes.

In step 702, central system 103 determines which systems store the files to be restored, e.g., hard drive of system crashed, using the metadata. As stated above, the backup application transmits to central system 103 a copy of the metadata associated with the data to be backed up on its system. This metadata includes information such as which systems store the backed up data.

In step 703, central system 103 connects to the one or more daemon applications on the one or more systems storing the files to be restored. It is noted that central system 103 may only connect to one of the two systems storing duplicate data.

In step 704, central system 103 requests to retrieve the data to be restored from the one or more daemon applications connected to central system 103 in step 703. As stated above, the backed up data may be stored across multiple systems. Hence, the data to be restored may be stored across multiple systems. Central system 103 may consequently request particular portions of the backed up data from each daemon application of the systems storing the backed up data.

In step 705, central system 103 receives the files to be restored from the one or more connected daemon applications. In step 706, central system 103 uncompresses and decrypts the received files to be restored using the key stored locally, e.g., disk unit 320. As stated above, central system 103 receives the key to decrypt the encrypted backed up files from the system whose data was backed up. In step 707, central system 103 restores the crashed system.

It is noted that method 700 may include other and/or additional steps that, for clarity, are not depicted. It is further noted that method 700 may be executed in a different order presented and that the order presented in the discussion of FIG. 7 is illustrative. It is further noted that certain steps in method 700 may be executed in a substantially simultaneous manner.

Although the system, method and computer program product are described in connection with several embodiments, it is not intended to be limited to the specific forms set forth herein, but on the contrary, it is intended to cover such alternatives, modifications and equivalents, as can be reasonably included within the spirit and scope of the invention as defined by the appended claims. It is noted that the headings are used only for organizational purposes and not meant to limit the scope of the description or claims.

The invention claimed is:

1. A method comprising:
configuring a computer network with a central system server in communication with at least two machines;
dynamically installing, by said central system server, a daemon application on each machine with available disk space;
receiving first metadata, by the central system server, from each installed daemon application, wherein said first metadata comprises information regarding at least one machine and the corresponding amount of available disk space of the at least one machine to store backup files;
creating a master file in the central system server, wherein said master file comprises the received first metadata;
installing a backup application, by the central system server, on a first machine of the at least two machines that needs a backup operation for at least one file stored therein;
receiving a request, by the central system server, from the backup application installed on the first machine to download said master file;
selecting, by the installed backup application on the first machine, from the downloaded master file at least one second machine available to store the at least one file; and
performing the backup operation to backup the at least one file to the at least one selected second machine.

2. The method as recited in claim 1 further comprising the steps of:
compressing and encrypting backup data; and
storing a second metadata and a key.

3. The method as recited in claim 2, wherein said second metadata comprises one or more of the following information: number of bytes of data backed up in a particular machine, machines storing said backup data, type of files in said backup data, ownership of files in said backup data, and privileges to execute said backup data.

4. The method as recited in claim 3, further comprising the step of:
transmitting said second metadata and said key to a said central system server.

5. The method as recited in claim 3, further comprising the steps of:
receiving, by the backup application, a list of files to be restored;
determining which machines store files of the list of files to be restored using said second metadata; and
connecting, by the backup application, to the corresponding daemon applications on the determined machines storing said files of the list of files to be restored.

6. The method as recited in claim 5, further comprising the steps of:
receiving said files to be restored from said corresponding daemon applications;
uncompressing and decrypting said files to be restored using said key; and
restoring said files to be restored.

7. A computer program product embodied in a machine readable medium comprising instructions executed by a processor for performing backup on a computer network with a central system server in communication with at least two machines, the executed instructions performing programming steps of:
- dynamically installing, by the central system server, a daemon application on each machine with available disk space;
- receiving first metadata, by the central system server, from each installed daemon application, wherein said fist metadata comprises information regarding at least one machine and the corresponding amount of available disk space to store backup files;
- creating a master file in the central system server, wherein said master file comprises the received first metadata;
- installing a backup application, by the central system server, on a first machine of the at least two machines that needs a backup operation for at least one file stored therein;
- receiving by the central system server, a request from said installed backup application on the first machine to download said master file;
- selecting, by the installed backup application on the first machine from the downloaded master file at least one second machine available to store the at least one file; and
- performing the backup operation to backup the at least one file to the at least one selected second machine.

8. The computer program product as recited in claim 7 further comprising the programming steps of:
- compressing and encrypting backup data; and
- storing a second metadata and a key.

9. The computer program product as recited in claim 8, wherein said second metadata comprises one or more of the following information: number of bytes of data backed up in a particular machine, machines storing said backup data, type of files in said backup data, ownership of files in said backup data, and privileges to execute said backup data.

10. The computer program product as recited in claim 9 further comprising the programming step of:
- transmitting said second metadata and said key to said central system server.

11. The computer program product as recited in claim 9 further comprising the programming steps of:
- receiving, by the backup application, a list of files to be restored;
- determining which machines store files of the list of files to be restored using said second metadata; and
- connecting, by the backup application, to the corresponding daemon applications on the determined machines storing said files of the list of files to be restored.

12. The computer program product as recited in claim 11 further comprising the programming steps of:
- receiving said files to be restored from said corresponding daemon applications;
- uncompressing said decrypting said files to be restored using said key; and
- restoring said files to be restored.

13. A system, comprising:
- a central system server:
- at least two machines connected to the central system server through a network, each machine in the system having a processor; and
- for each machine, a memory unit storage coupled to said processor a computer program, wherein said computer program is embedded in said central system server and executed by said central system server, the executed computer program performs:
- dynamically installing a daemon application on each machine with available disk space;
- receiving first metadata, by the central system server, from each installed daemon application, wherein said first metadata comprises information regarding at least one machine and the corresponding amount of available disk space of the at least one machine to store a backup file;
- creating a master file in the central system server, wherein said master file comprises the received first metadata;
- installing a backup application, by the central system server, on a first machine of said at least two machines that needs a backup operation for at least one file stored therein;
- receiving, by the central system server, a request from said installed backup application to download said master file;
- selecting, by the installed backup application, from the downloaded master file at least one second machine available to store the at least one file; and
- performing the backup operation to backup the at least one file to the at least one selected second machine.

14. The system as recited in claim 13, wherein said backup application comprises instructions for receiving a list of files to be backed up.

15. The system as recited in claim 14, wherein said backup application further comprises:
- instructions for compressing and encrypting backup data; and
- instructions for storing a second metadata and a key.

16. The system as recited in claim 15, wherein said second metadata comprises one or more of the following information: number of bytes of data backed up in a particular system, systems storing said backup data, type of files in said backup data, ownership of files in said backup data, and privileges to execute said backup data.

17. The system as recited in claim 16, wherein said backup application further comprises:
- instructions for transmitting said second metadata and said key to said central system server.

18. The system as recited in claim 16, wherein said backup application further comprises:
- instructions to receive a list of files to be restored by a backup application;
- instructions to determine which machine to store files of the list of files to be restored using said second metadata; and
- instructions to connect the backup application to the corresponding daemon applications stored on said determined machines storing said files of the list of files to be restored.

19. The system as recited in claim 18, wherein said backup application further comprises:
- instructions for receiving said files to be restored from said corresponding daemon applications;
- instructions for uncompressing and decrypting said files to be restored using said key; and
- instructions for restoring said files to be restored.

* * * * *

UNITED STATES PATENT AND TRADEMARK OFFICE
CERTIFICATE OF CORRECTION

PATENT NO. : 7,574,458 B2 Page 1 of 1
APPLICATION NO. : 10/734864
DATED : August 11, 2009
INVENTOR(S) : James J. Rhodes It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1004 days.

Signed and Sealed this

Seventh Day of September, 2010

David J. Kappos
*Director of the United States Patent and Trademark Office*